United States Patent [19]

Brooks et al.

[11] Patent Number: 4,625,216

[45] Date of Patent: Nov. 25, 1986

[54] THERMAL PRINTHEAD LIFE EXTENSION TECHNIQUE

[75] Inventors: Ralf M. Brooks; Brian P. Connell, both of Waterloo, Canada

[73] Assignee: NCR Canada Ltd., Mississauga, Canada

[21] Appl. No.: 762,737

[22] Filed: Aug. 5, 1985

[51] Int. Cl.⁴ .............................................. G01D 15/10
[52] U.S. Cl. ................................. 346/76 PH; 400/120
[58] Field of Search .................... 346/76 PH; 400/120, 400/53; 219/216 PH

[56] References Cited

U.S. PATENT DOCUMENTS

| | | | |
|---|---|---|---|
| 4,347,518 | 8/1982 | Williams et al. | 346/76 PH |
| 4,453,166 | 6/1984 | Enoto | 346/76 PH |
| 4,595,935 | 8/1984 | Brooks et al. . | |

*Primary Examiner*—A. Evans

*Attorney, Agent, or Firm*—Wilbert Hawk, Jr.; Albert L. Sessler, Jr.

[57] ABSTRACT

A system and method are disclosed for automatically compensating for overutilized elements in a thermal printhead. The system is implemented by utilizing a graphics style line thermal printhead with a greater number of resistive or thermal elements than are needed for the maximum number of characters to be printed. These spare or extra elements are positioned on the leading side of a nominal designated print area or field within the thermal printhead, such that a microprocessor under software control can sequentially shift for each new print line the leading edge of all character positions contained in the print field incrementally to one side, allowing increased utilization of formerly underutilized elements. In a preferred embodiment the magnitude of this sequential sideways shift is determined by the number of spare or extra elements which border the leading side of the nominal print field.

9 Claims, 18 Drawing Figures

FIG. 4

TABLE

| CHECK OR DOCUMENT NUMBER | POSITION CONTROL VALUE | PRINT HEAD ELEMENT POSITION OF RIGHT MOST EDGE OF THE 8TH CHARACTER |
|---|---|---|
| 1 | 0 | 151 |
| 2 | 1 | 150 |
| 3 | 2 | 149 |
| 4 | 3 | 148 |
| 5 | 4 | 147 |
| 6 | 5 | 146 |
| 7 | 6 | 145 |
| 8 | 7 | 144 |
| 9 | 8 | 143 |
| 10 | 9 | 142 |
| 11 | 10 | 141 |
| 12 | 0 | 151 |
| 13 | 1 | 150 |
| 14 | 2 | 149 |
| 15 | 3 | 148 |
| 16 | 4 | 147 |
| 17 | 5 | 146 |
| 18 | 6 | 145 |
| 19 | 7 | 144 |
| 20 | 8 | 143 |
| 21 | 9 | 142 |
| 22 | 10 | 141 |
| 23 | 0 | 151 |
| 24 | 1 | 150 |
| 25 | 2 | 149 |
| ⋮ | ⋮ | ⋮ |

10 0's CLOCKED IN

234 DATA BITS (D) CLOCKED IN 76 0's CLOCKED IN

0 POSITION CONTROL 0's CLOCKED IN 10 0's CLOCKED IN

234 DATA BITS (D) CLOCKED IN 76 0's CLOCKED IN

1 POSITION CONTROL 0 CLOCKED IN

THERMAL PRINTHEAD LIFE EXTENSION TECHNIQUE

CROSS REFERENCE TO RELATED PATENT APPLICATIONS

The commonly assigned, co-pending U.S. patent applications Ser. No. 640,894, now U.S. Pat. No. 4,595,035, filed Aug. 14, 1984 for System and Method for Automatically Detecting Defective Thermal Printhead Elements, inventors Ralf M. Brooks, Arvind C. Vyas and Brian P. Connell and Ser. No. 737,836, filed May 24, 1985, for Closed Loop Thermal Printer For Maintaining Constant Printing Energy, inventor Ralf M. Brooks, are related to this application.

BACKGROUND OF THE INVENTION

1. Field of the Invention

This invention relates to thermal printers and more particularly to a system and method for increasing the operational life of a thermal printhead in a thermal printer by selectively changing, from document to document or print line to print line, the absolute position of the characters to be printed by associated elements in the printhead.

2. Description of the Prior Art

Different types of thermal printer systems have been proposed for improving the operational capabilities of thermal printers by shifting the position of the print line under certain operational conditions.

U.S. Pat. No. 4,453,166 discloses a method and device for avoiding a detected defective element in a thermal printer by shifting the printing data one to three bits in either direction so that a non-printing bit in the printing data is positioned at the position of the defective element to enable the thermal printing operation to be continued.

The above-referenced U.S. patent application Ser. No. 640,894 discloses a system and method for automatically detecting defective thermal printhead elements in a thermal printer and for automatically correcting for at least one defective thermal printhead element by shifting the entire serial print line such that the defective element is assigned to a position between adjacent characters that are to be printed.

None of the above-cited thermal printers increases the useful life of a thermal printhead by automatically selectively shifting, from document to document, the entire print line of characters to be printed in order to achieve a more balanced use of the elements in the thermal printhead.

SUMMARY OF THE INVENTION

Briefly, a system and method therefor is provided for automatically compensating for overutilized thermal elements in a thermal printhead by rotating the entire print line successively to one side for a preselected number of successive print lines and then returning to a starting position to repeat the cycle. Such a procedure causes the increased utilization of the formerly underutilized elements.

In accordance with one aspect of the invention, there is provided a thermal printing system for printing on documents, said system comprising: an array of thermal elements; means for producing serial data representative of a line of multiple character segments to be printed, said serial data having a preselected number of character positions selectively associated with said thermal elements; means responsive to said serial data for enabling said array of thermal elements to thermally print a line of character segments on an associated document in accordance with said serial data; and means for determining an associated different position control value for each successive document to be printed; and means responsive to each position control value for enabling said producing means to shift for each document the position of said serial data with respect to said thermal elements by a number of positions equal to said associated position control value.

In accordance with a second aspect of the invention, there is provided a method for increasing the useful life of a thermal printhead, said method comprising the steps of: producing serial character segment data having a preselected number of character positions selectively associated with an array of thermal elements; enabling the array of thermal elements to thermally print characters on an character segment data; determining an associated different position control value for each successive document to be printed; and causing the position of the serial character segment data for any given document to be shifted with respect to the thermal elements by a number of positions equal to the position control value associated with the given element.

In accordance with a third aspect of the invention, there is provided a thermal printing system comprising: means for producing serial character segment data and enabling pulses; thermal printing means for thermally printing characters, said thermal printing means including a plurality of linearly aligned thermal elements, first means for selectively storing said serial character segment data, said first means having a plurality of storage locations corresponding in number to said thermal elements, and second means being responsive to said serial character segment data in said first means and to said enabling pulses for selectively applying driving pulses corresponding to said serial character segment data to said thermal elements to enable said thermal elements to print a line of character segments in accordance with said serial character segment data stored in said first means; means for determining an associated different position control value for each successive document to be printed; and means responsive to said position control value for enabling said first means to shift for each document the position of said serial character segment data with respect to said thermal elements by a number of positions equal to said associated position control value.

BRIEF DESCRIPTION OF THE DRAWINGS

Various objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 4 is a TABLE showing the shift of the print element position of the right-most edge of the eighth character position for 25 consecutive documents or separate print lines;

DESCRIPTION OF THE PREFERRED EMBODIMENT

The thermal printing system of the invention will be described in relation to its application in, for example, a 6.06 dot per millimeter thermal line printer (described in U.S. Pat. No. 4,394,092) which prints at least one of several financial fonts (e.g., E-13B, CMC-7, OCR A and OCR B) which have leading zeros. However, it should be realized that the thermal printing system of the invention could be used in any thermal printer application, such as in journal and lister printers, where character construction biases the utilization of some thermal elements over others.

Before the thermal printing system of the invention is described in detail, reference will now be made to FIGS. 1-4 to explain the problem that is solved by the thermal printing system of the invention.

Figure 1:
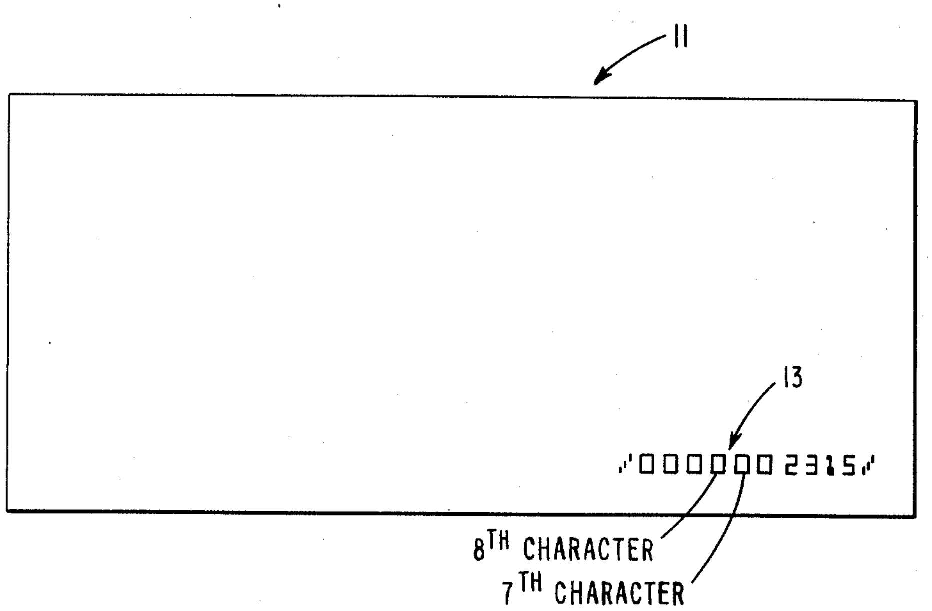
FIG. 1 illustrates a standard, twelve-character, amount-field encoded on a document, such as a check, with the amount-field being produced by a printer in which the invention can be used.

FIG. 1 generally illustrates a document or check 11 encoded with a standard 12 character "amount field" 13 having an exemplary value of $23.15. Note that the ABA (American Bankers' Association) specified format requires a 10 digit numeric "amount field" along with two enclosing amount symbols, regardless of the value of the check. In the example shown in FIG. 1, six leading zeros (0's) must precede the value 2315 to comply with this format. It should be noted at this time that at least 72 percent of the checks cashed in the United States each year are for values less than $100.00, while 95 percent of such checks are for values less than $1000.00. It can therefore be seen that most of the checks being processed or encoded have a large number of leading zeros in their amount fields.

Figure 2:
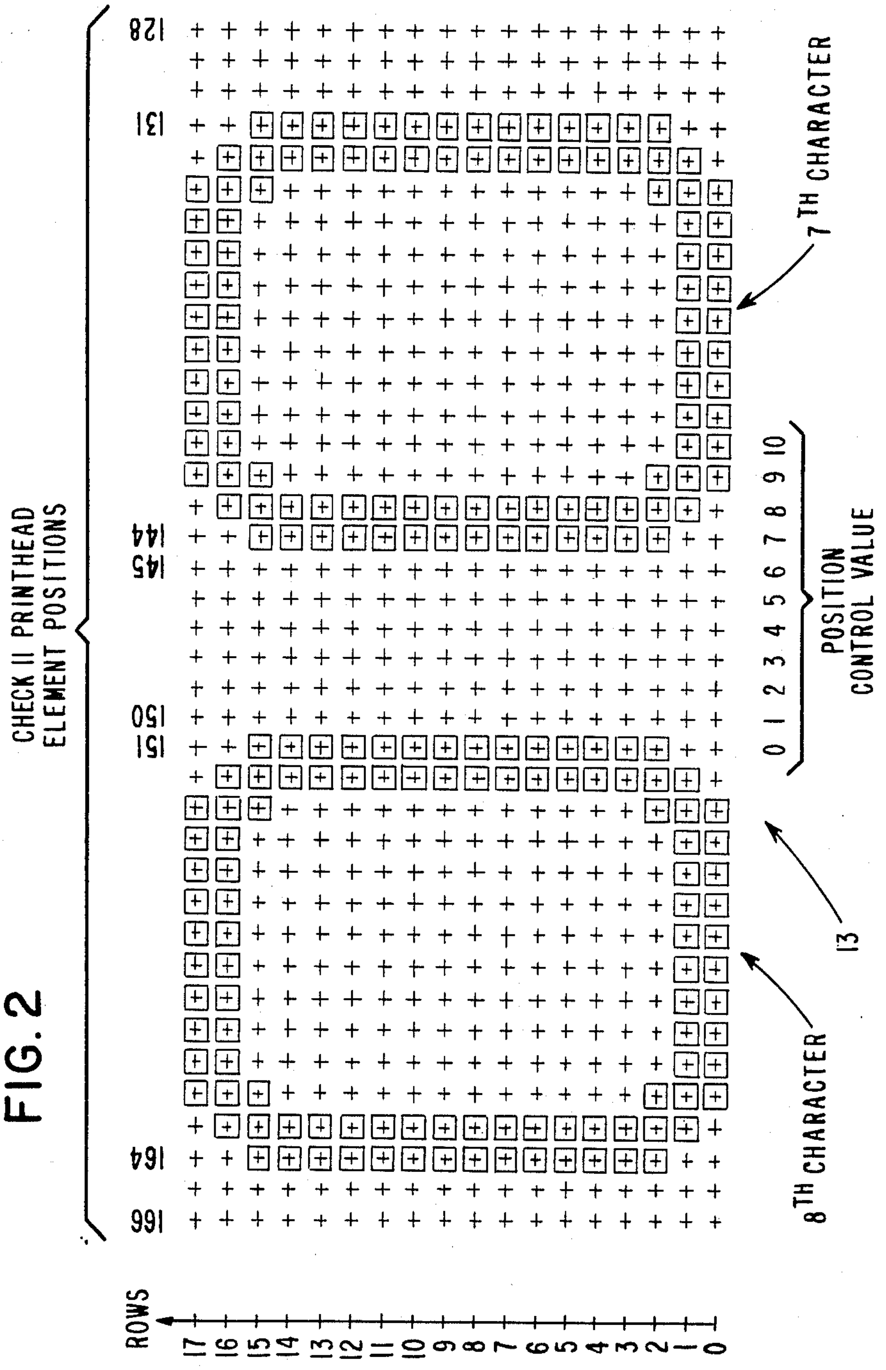
FIG. 2 illustrates an enlarged view of the seventh and eighth dot matrix "0" (zero) characters of FIG. 1.
Figure 5:
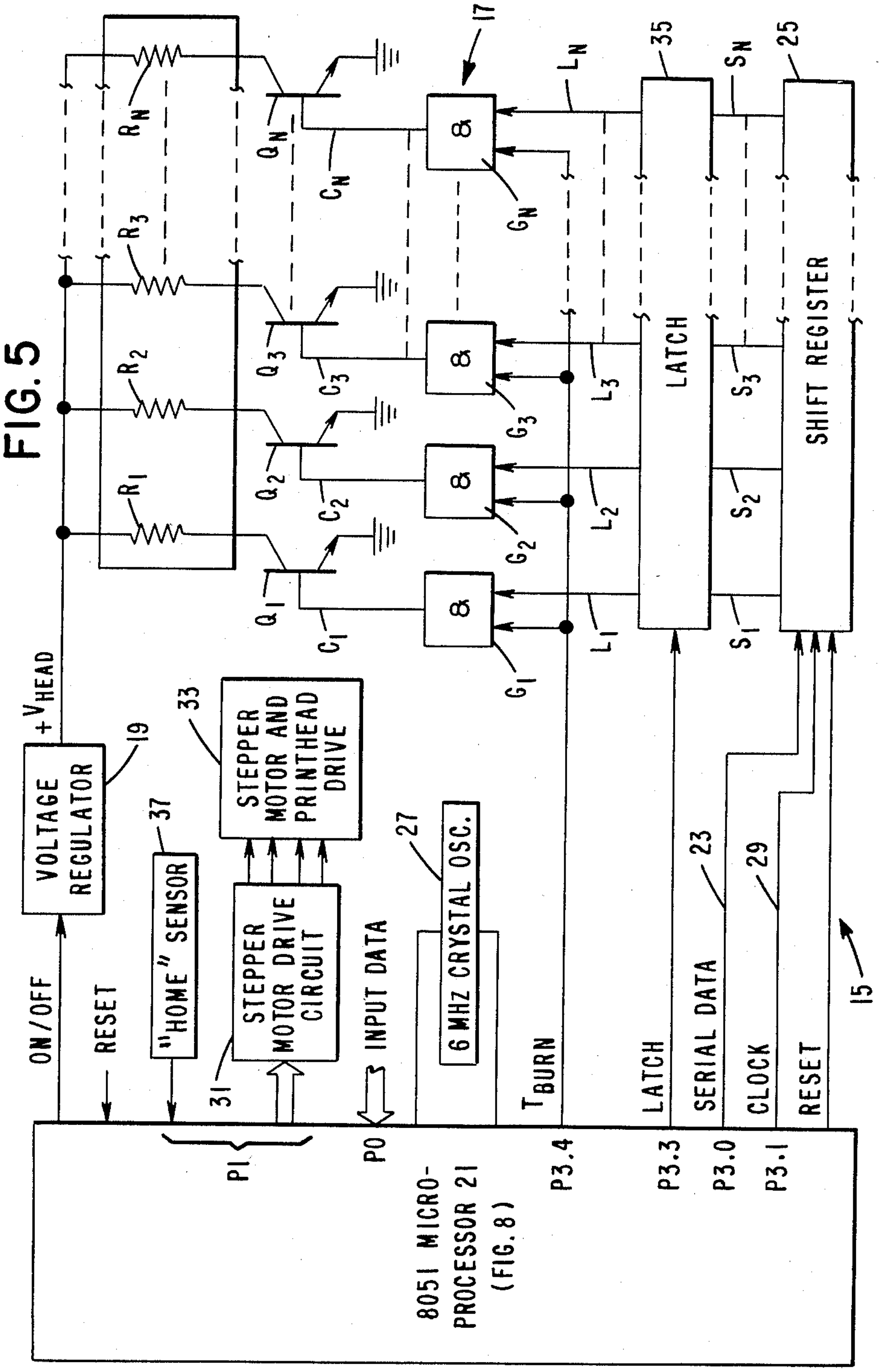
FIG. 5 a schematic block diagram of a preferred embodiment of the invention.

FIG. 2 illustrates an enlarged view of two of such leading zeros (0's) from the seventh and eighth character positions of the amount field 13 shown in FIG. 1. Each zero is represented by a 14 by 18 dot matrix array with a 6 dot space between characters. The amount field printed on the check 11 in FIG. 1 is printed in a preferred embodiment by a conventional dot matrix, 320 element, graphics line-style thermal printhead (FIG. 5). Thus, FIG. 2 illustrates printhead element positions 128 through 166 from such a 320 element printhead.

To print the entire amount field shown in FIG. 1, such a thermal printhead would move vertically, stepping in 18 discrete steps to print the 18 lines of data partially shown in FIG. 2. The plus (+) marks in each horizontal line in FIG. 2 indicate the dot or element positions during each discrete step, while the squares around selected one of the element positions in each horizontal line indicate those element positions which were printed on the check 11 during each discrete step.

FIG. 2 indicates a typical problem that is involved in thermally printing the amount field 13 on the check 11 of FIG. 1. This problem is that some of the thermal elements in the line thermal printhead that are being used to print the amount field 13 will be utilized much more frequently than other elements. For example, the thermal elements at element positions 132, 143, 152 and 163 will be used 16 times for each amount field 13 that is printed on a check 11, whereas the thermal elements at element positions 138 and 158 will only be used 4 times for each check 11 that is printed.

It is well known in the thermal printing art that the life of a thermal element in a thermal printhead is directly related to the number of times electrical current is passed through that element to cause that element to print. Therefore, it should be obvious that the thermal elements at element positions 132, 143, 152 and 163 will become defective much sooner than the thermal elements at element positions 138 and 158. In an application like check processing, a single defect in a single character (due to a defective thermal element in a thermal printhead) can lead to a number of checks being "rejected". Such rejected checks would then have to be manually processed at additional expense and time.

The thermal printing system of the invention solves the above-described problem (and thereby increases the useful life of the associated thermal printhead) by modifying from check to check the software-controlled bit stream which controls the absolute positions of the characters to be printed in the printhead, so that on successive documents or checks the character edges are sequentially shifted to one side to permit increased utilization of previously underutilized elements.

Figure 3:
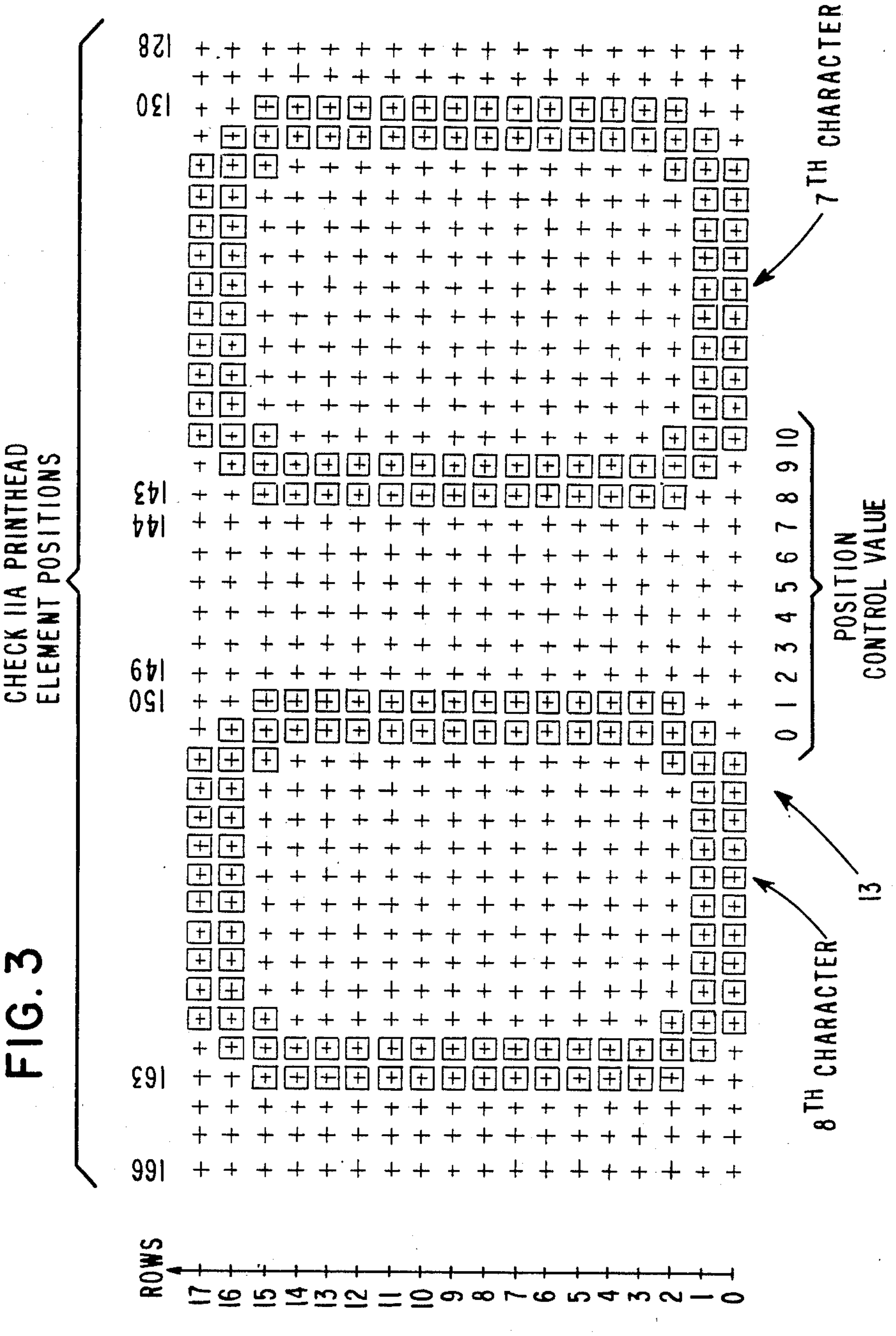
FIG. 3 shows the shift from the seventh and eighth "0" character positions shown in FIG. 2 for printing the seventh and eighth dot matrix "0" characters on the next document.

FIG. 3 illustrates the shift in the character positions for the printing of the seventh and eighth "0" characters on the next or second check 11A after the check 11 of FIG. 2. For purposes of this explanation, it is assumed that check 11A has a value less than 1,000.00. Note the righthand shift in the rightmost edge of the eighth character position from the thermal printhead element position 151 for check 11 in FIG. 2 to the thermal printhead element position 150 for check 11A in FIG. 3. Each of the remaining character positions shown in FIG. 3 tracks this right-hand shift by also shifting one element position to the right. This shift of one element position for the character line for check 11A causes other elements in the thermal printhead to now be utilized, which elements would not be utilized if fixed character positions were assigned to the elements of the thermal printhead. For example, the printhead elements at positions 130 and 150, which never would have been used if the character positions had remained static (i.e., the rightmost edge of the eighth character position always at element position 151 for all checks) are now "sharing the load" in the printing operation.

FIG. 4 is a TABLE which illustrates the printhead element position of the rightmost edge of the eighth character for 25 successive checks or documents, starting with the first check 11 of FIG. 2 and the second check 11A of FIG. 3. In the exemplary TABLE of FIG. 4, note that the printhead element position of the rightmost edge of the eighth character sequentially shifts from element position 151 to element position 141 before returning to element position 151 to repeat the sequence. As stated before, all of the rest of the characters in the amount field will track this rightmost edge, and move as it moves. This full utilization of all of the elements in a thermal printhead, as opposed to the overwork of a select few elements, will lead to an increased effective life for the thermal printhead.

Referring now to FIG. 5, a preferred embodiment of a thermal printing system 15 of the invention is disclosed for automatically shifting, from document (or check) to document (or check) or print line to print line, the leading edges of all characters contained within the print field until all underutilized elements have been substantially equally used in the thermal printing of checks or documents. In the system of FIG. 5, thermal resistive elements or heater elements $R_1$-$R_N$ are positioned in line on an insulated ceramic or glass substrate (not shown) of a thermal printhead 17, which also includes a shift register 25, latch 35, gates $G_1$-$G_N$ and NPN driver transistors $Q_1$-$Q_N$. As shown in FIG. 5, upper terminals of the elements $R_1$-$R_N$ are commonly connected to a $+V_{HEAD}$ voltage from a voltage regulator 19 whenever the voltage regulator 19 receives an ON signal from a processor 21. This processor 21 can be a computer, microprocessor or any other suitable computing device. For purposes of this description, the processor 21 is an 8051 microprocessor manufactured by Intel Corporation, Santa Clara, Calif.

Lower terminals of the elements $R_1$-$R_N$ are respectively connected to the collectors of NPN driver transistors $Q_1$-$Q_N$, whose emitters are grounded. These transistors $Q_1$-$Q_N$ are selectively turned on (to be explained) by high or 1 state signals applied to their bases in order to ground preselected ones of the lower terminals of associated ones of the elements $R_1$-$R_N$ to thermally print a dot line or a print line of information. Each of the transistors $Q_1$-$Q_N$ that is turned on allows current to flow through its associated one of the thermal resistive elements $R_1$-$R_N$ for the period of time that that transistor is turned on by a $T_{BURN}$ pulse (to be explained). The resulting $I^2Rt$ energy (typically 2-3 millijoules per element) causes heat transfer to either a thermal transfer ribbon (not shown) to effect ink transfer to plain paper (not shown) or causes a recipient thermal paper (not shown), when used, to develop.

A serial data line 23 is connected from the processor 21 to a data input of a shift register 25. This shift register 25 is comprised of a sequence of N flip-flops (not shown) which are all reset to 0 state outputs by a RESET pulse from the processor 21 before any data is stored therein. An exemplary 6 MHz signal from a crystal oscillator 27 is internally counted down by a timing circuit (FIG. 6) to develop an exemplary 500 KHz CLOCK on line 29.

In the system to be described assume that there are a total of N elements in the printhead 17, but only M elements of those N elements are to be used for printing. In this discussion, an exemplary 320 element printhead 17 will be used to print a 12 character "amount field" (as shown in FIG. 1) in an item (check) processing environment. Therefore, in this discussion the shift register 25 is also 320 bits long to match the 320 thermal elements ($R_1$-$R_N$, where $N=320$) in the thermal printhead 17.

Each of the 12 exemplary characters to be printed is 14 bits (or 14 thermal elements) wide, with the space between adjacent characters being 6 bits (or 6 thermal elements) wide. Thus, for 12 characters only 234 bits (or thermal elements) of the 320 bits (or thermal elements) will contain "real information" to be printed. As a result, there are 86 "extra" thermal elements which rotationally can be used for this exemplary printing operation. At initialization, when a position control value=0 (to be explained), the "amount field" will be considered to be properly positioned if 10 binary 0 bits or blanks precede the 234 bits of "real information" and 76 binary 0 bits or blanks follow those 234 bits.

In the printing operation of the thermal printing system 15 of the invention, the processor 21 sets the serial data line 23 low (to be explained) for a first preselected number of CLOCKS. Thus, a first preselected number of binary 0's are shifted into the shift register 25 by the first preselected number of CLOCKS. Then a stream of SERIAL DATA of M bits in length is shifted from the processor 21 onto the SERIAL DATA line 23 and into the shift register 25 by the next M CLOCKS. Next, the processor 21 sets the SERIAL DATA line 23 low for a second preselected number of CLOCKS. Thus, a second preselected number of binary 0's are shifted into the shift register 25 by the second preselected number of CLOCKS. Finally, and the key to the shifting operation, the processor 21 sets the SERIAL DATA line 23 low for a number of CLOCKS equal to the present value of a variable position control number or value (to be explained).

For purposes of the following description of the invention, assume that: $N=320$, $M=234$, the first and second preselected numbers are respectively equal to 10 and 76, and the position control value can sequentially vary from 0 through 10 (as indicated in FIG. 4) but is=0 on initialization for a first document (the first set of 18 lines) to be printed. As a result, in this example 10 binary 0's, followed by the 234 data bits (D) in the stream of SERIAL DATA and followed by 76 binary 0's are sequentially shifted into the shift register 25 to fill that register 25 with a total of 320 bits, as shown in FIGS. 6A-6D. The 234 bits in the stream of SERIAL DATA represent the next line or row of data that is to be thermally printed. In this case, assume that this next line or row of data to be printed is to be the first line or row of a first document at initialization (when the position control value=0).

Preparatory to the printing of the first line on the first document, the processor 21 generates signals to enable a stepper motor drive circuit 31 to cause a stepper motor and printhead drive 33 to move the thermal printhead 17 from a "home" position (not shown) to a "row 0" start position (not shown) such that the first line can be printed on that first document. Such means for controlling the movement of the thermal printhead 17 to a row 0 position, as well as to additional subsequent row positions, for printing character segments or rows on a document is well known to those skilled in the thermal printing art, forms no part of the instant invention and, therefore, requires no further detailed description.

The 320 bits of row 0 data stored in register 25 are supplied in parallel over lines $S_1$-$S_N$ to associated inputs of a latch 35. When the 320 bits stored in the register 25 have stabilized, a LATCH signal from the processor 21 enables latch 35 to simultaneously store in parallel the 320 bits from register 25. Once the 320 bits are stored in latch 35, another line or row of 320 bits can be sequentially clocked from the processor 21 into the shift register 25 via SERIAL DATA line 23.

The 320 bits of row 0 data stored in latch 35 are respectively applied in parallel over lines $L_1$–$L_N$ to first inputs of AND gates $G_1$–$G_N$. These 320 bits of row 0 data determine which ones of the thermal elements $R_1$–$R_N$ will be activated when a high $T_{BURN}$ pulse from the processor 21 is commonly applied to second inputs of the AND gates $G_1$–$G_N$. More specifically, only those of the lines $L_1$–$L_N$ that are high (logical 1) will activate their associated ones of the elements $R_1$–$R_N$ to thermally print when the TBURN pulse is high. For example, if the binary bit on line $L_{100}$ is high, it will be ANDed in AND gate $G_{100}$ with the common $T_{BURN}$ pulse and turn on transistor $Q_{100}$, causing current to flow through thermal element $R_{100}$ for the length of time t controlled by the width of the $T_{BURN}$ pulse. The resulting $I^2Rt$ energy dissipated by element $R_{100}$ causes a dot to be thermally printed at that $R_{100}$ location on the document.

After row 0 (FIG. 2) is printed on the first document, the processor 21 generates signals to enable the stepper motor drive circuit 31 to cause the stepper motor and printhead drive 33 to move the thermal printhead 17 from the "row 0" position to a "row 1" position (FIG. 2) so that the second line can be printed on that first document.

The above-described printing operation is repeated until all of the required rows of data are printed on the first document. For example, as shown in FIG. 2, 18 rows or lines (0–17) are printed to obtain the exemplary 18 row amount field partially shown by the seventh and eighth characters. Assume that FIG. 2 represents a partial section of the first document. Note again that with a position control value=0 the rightmost edge of the eighth character is at printhead element position 151.

After the exemplary 18 row (row 0–row 17) amount field has been printed for the first document, the processor 21 generates signals to enable the stepper motor drive circuit 31 to cause the stepper motor and printhead drive 33 to move the thermal printhead 17 back toward the "home" position. A reflective-optical "home" sensor 37 applies a signal to the processor 21 as soon as it senses that the thermal printhead 17 has reached the "home" position. In response to this signal from the sensor 37, the processor 21 generates signals to enable the drive circuit 31 to cause the stepper motor and printhead drive 33 to stop the printhead 17 at the "home" position. The sensor 37 is of a type well known to those skilled in the art and is also not germane to this invention and, therefore, requires no further description.

When the second document is to be printed, the processor 21 again generates signals to enable the printhead 17 to be moved from the "home" position to the "row 0" position. However, the selective storage of the 320 bits of row 0 data, as well as for each of the remaining 17 rows of data for this second document, in the shift register 25 is modified for this second document.

Figures 6A, 6B, 6C, 6D, 7A, 7B, 7C, 7D:
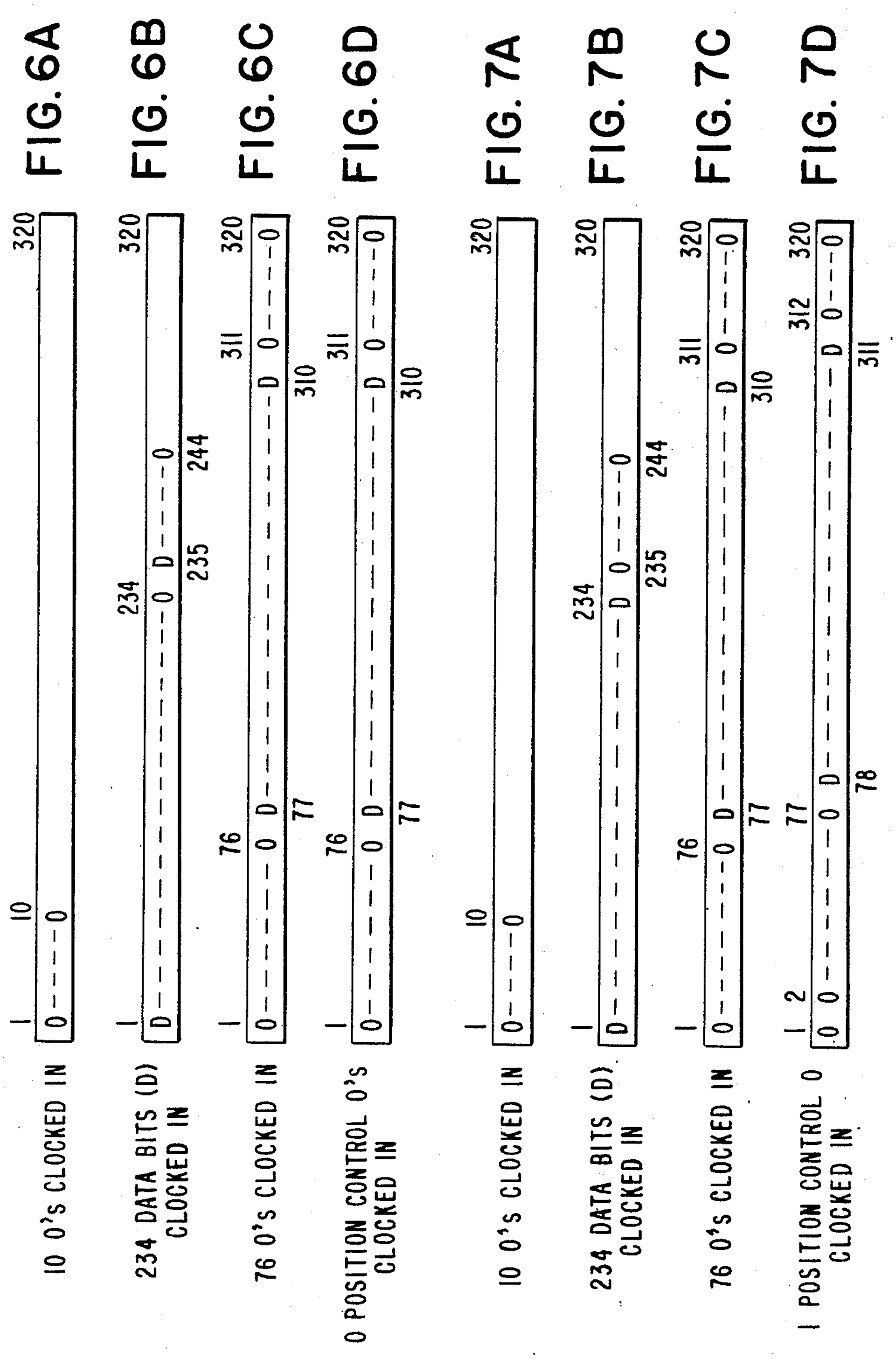
FIGS. 6A-6D illustrate the steps involved in positioning 234 data bits and 86 binary 0's in a row or line to be printed for a first document.
FIGS. 7A-7D illustrate the steps involved in positioning 234 data bits and 86 binary 0's in a row or line to be printed for a second document.

For the storage of the above-formatted, exemplary 320 bits of row 0 data in the register 25 for this second document, 10 binary 0's, followed by the 234 data bits (D) in the stream of SERIAL DATA for this second document, followed by 76 binary 0's are sequentially shifted into the shift register 25, as shown in FIGS. 7A–7C, in the same manner as previously discussed for the first document. However, as will be explained later, the processor 21 internally changes the position control value from a value of 0 to a value of 1 for the second document. As a result, the SERIAL DATA line 23 is set to a low value and a single CLOCK pulse is generated so that an additional binary 0 is shifted into the register 25. This additional bit shift shifts the collective position of the 234 bits in the stream of SERIAL DATA for row 0 for the second document one position further to the right in the register 25 as, as shown in FIG. 7D.

It is the position of these 234 bits in the register 25 which determines which of the elements $R_1$–$R_{320}$ will be used to print the first data line (row 0) on the second document. Consequently, the first data line printed on the second document will also be shifted one position further to the right in relation to the positions of the elements $R_1$–$R_{320}$ in the printhead 17.

The above described operation for row 0 of the second document is repeated for each of the remaining 17 rows or lines to be printed on the second document, with the position control value also being equal to 1 for each of these remaining 17 rows. Thus, as shown in FIG. 3, the absolute positions of the seventh and eighth characters for the second document have been shifted one position to the right, when compared to the absolute positions of the corresponding characters shown in FIG. 2. Note in FIG. 3 that, with the position control value =1, the rightmost edge of the eighth character is at printhead element position 150.

As indicated in FIG. 4, successive cycles of position control values are developed (by the processor 21), with each cycle of position control values ranging from 0 through 10. Thus, as is shown in FIG. 4, the printhead element position of the rightmost edge of the eighth character for 25 consecutive documents is sequentially shifted through printhead element positions 151–141 before repeating this sequence. The rightmost edges of the remaining 11 characters also track the eighth character edge and shift accordingly. Such document-to-document changes in the format of the data to be printed on successive documents operates, as stated before, to increase the operational life of the thermal printhead 17 by achieving a more balanced use of the thermal elements $R_1$–$R_{320}$ in the printhead 17.

Figure 8:
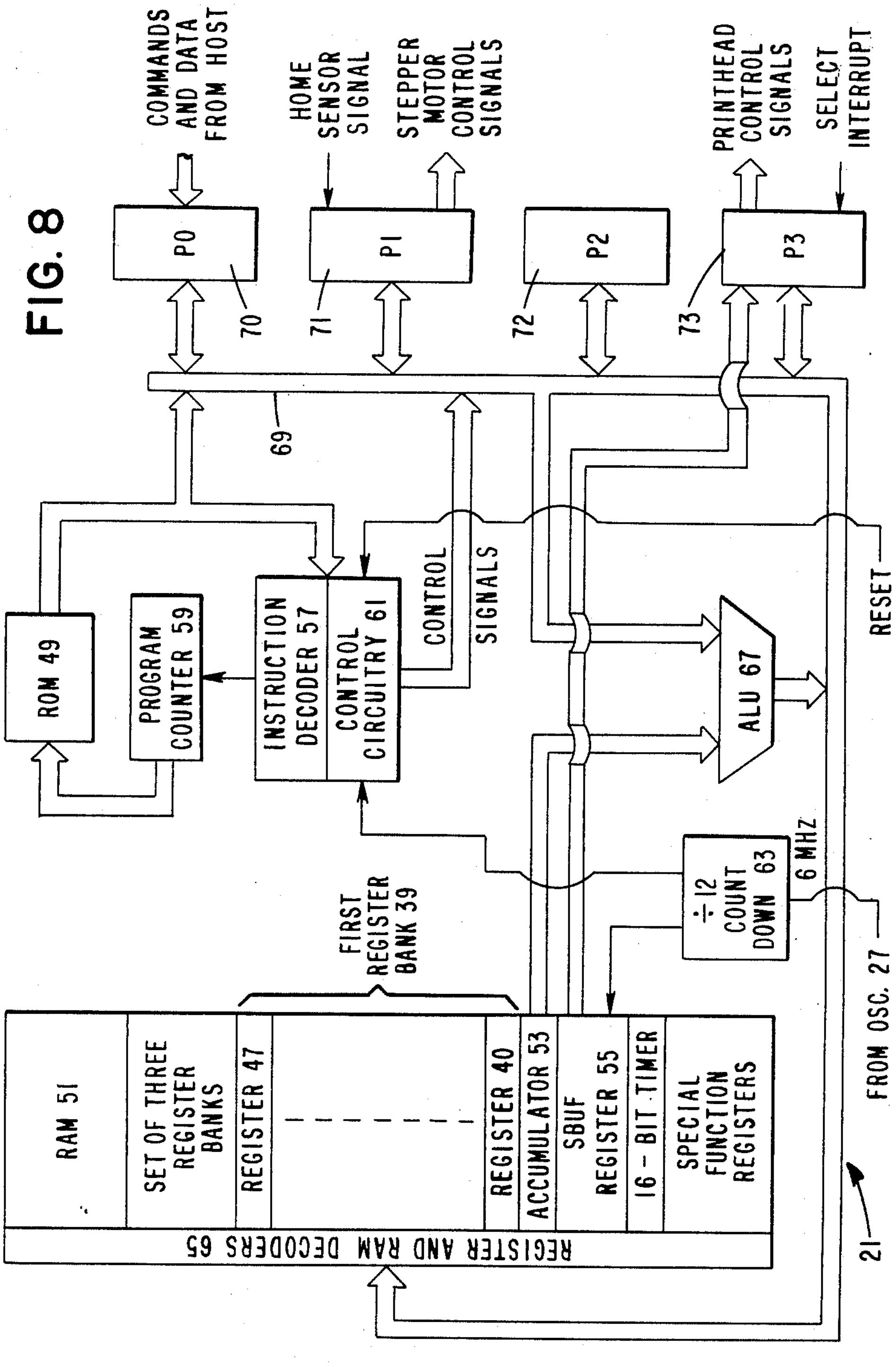
FIG. 8 is a schematic block diagram of the microprocessor of FIG. 5.

FIG. 8 is a schematic block diagram of the 8051 microprocessor 21 of FIG. 5. As shown in FIG. 8 the microprocessor 21 includes a first register bank 39 comprised of registers 40–47, a read only memory (ROM) 49 which stores the firmware program to be performed, a random access memory (RAM) 51 for temporarily storing data, an accumulator 53, a serial buffer register (SBUF) 55, an instruction decoder 57 which generates signals to control the operations of the microprocessor 21, control circuitry 61 for developing and applying control signals to the stepper motor drive circuit 31 (FIG. 5), a divide-by-twelve (÷12) countdown circuit 63 responsive to the 6 MHz signal from crystal oscillator 27 (FIG. 5) for developing a 500 KHz clock signal at its output, register and RAM decoders 65, an arithmetic logic unit (ALU) 67 controlled by the software program in the ROM 49 for performing arithmetic and logical operations, an internal bus 69 and ports 70–73 for bidirectionally passing data and control signals between the internal bus and other circuitry shown in FIG. 5. The register 40 is utilized to store the current position control value, while the register 41 is utilized to store the number of rows that have been printed on any document currently being printed.

Figure 9:
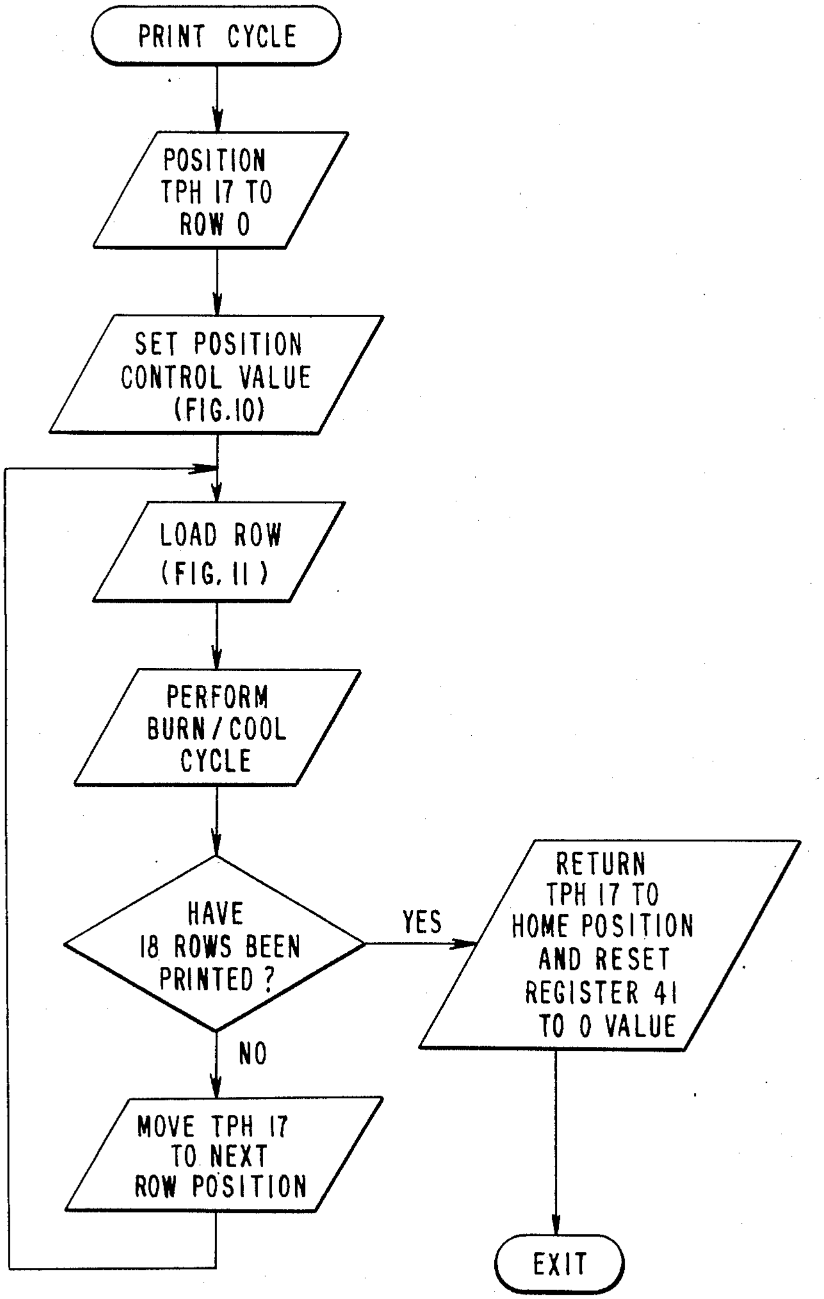
FIG. 9-11 illustrate a flow diagram giving the steps in a thermal printing operation and showing how the character positions are shifted as a function of the respective number of each of a plurality of consecutive documents.

The overall flow diagram for the thermal printing system of FIG. 5 is shown in FIG. 9 and will be explained by also referring to FIGS. 5 and 8.

In the first subroutine of the PRINT CYCLE operation, the microprocessor 21 develops control signals at port 71 to enable the stepper motor drive circuit 31 to cause the stepper motor and printhead drive 33 to move the thermal printhead 17 from the home position to the row 0 position so that the first line may be printed on a document. In the next subroutine (FIG. 10) the position control value is set to determine the relative positions of the characters to be printed with respect to the fixed positions of the thermal elements $R_1$–$R_N$ in the printhead 17. The "load row" subroutine (FIG. 11) is used to selectively load the appropriate line information for the next line into the shift register 25. Then a "burn/cool cycle" subroutine is performed by first generating a LATCH pulse to move the line information from the shift register 25 into the latch 35 and then generating a $T_{BURN}$ pulse of controlled duration to energize selected ones of the thermal elements $R_1$–$R_{320}$ to print the line information on a document. Following this a cool cycle is initiated which allows the heated elements to cool down to ambient temperature.

Each time that a burn/cool cycle subroutine is performed, the row number stored in the register 41 is incremented by one to maintain a count of the number of rows that have been printed on the document currently being printed. The count in the register 41 is compared against the fixed number 18 (in this example) to determine if 18 rows have been printed. If all 18 rows have not been printed, the PRINT CYCLE operation of FIG. 9 successively calls a subroutine to move the thermal printhead (TPH) 17 to the next row position, loops back to repeat the "load row" and "burn/cool cycle" subroutines and again checks to see if 18 rows have been printed on the document. The sequence of operation of these three subroutines is repeated until all 18 rows have been printed. When all 18 rows have been printed, a subroutine is called to return the thermal printhead 17 to its home position and to reset the register 41 to a zero value. The PRINT CYCLE of FIG. 9 is then completed.

The key subroutines in FIG. 9 that are germane to this invention are the "set position control value" and "load row" subroutines, which are both involved in the selective formatting of the data to be stored in the register 25 (FIG. 5) for subsequent printing. These subroutines will be discussed in more detail by now referring to the flowcharts of FIGS. 10 and 11 and to the circuit of FIG. 12.

Figure 10:
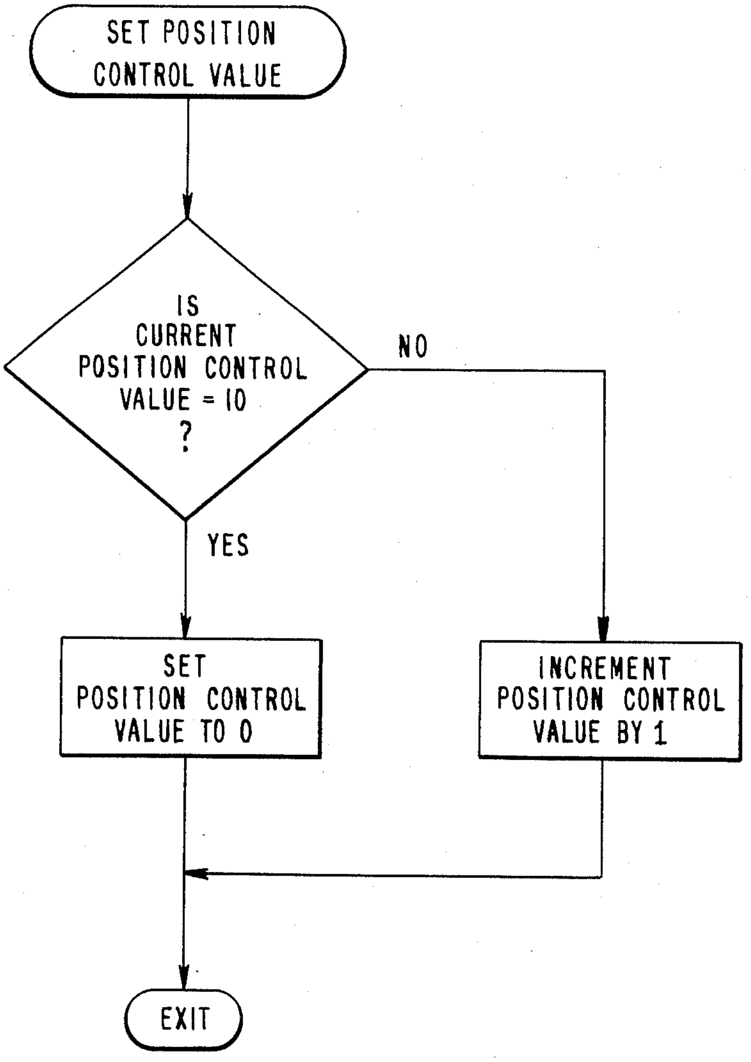

The "set position control value" subroutine of FIG. 10 is used at the start of each PRINT CYCLE to determine the relative positions of the characters to be printed with respect to the fixed positions of the thermal elements $R_1$–$R_{320}$ in the printhead 17. On "power up" of the system of FIG. 5, the position control value is automatically reset to a zero value. As stated before, the position control value is stored in register 40 (FIG. 8) of the microprocessor 21.

In operation, the "set position control value" subroutine performs a compare operation, whereby the program stored in the ROM 49 (FIG. 8) controls the movement of a value of 10 into the accumulator 53 (FIG. 8) and then compares this value to the position control value stored in the register 40 (FIG. 9) to determine if the position control value =10. If the position control value is less than 10, the position control value is incremented by one. Operationally, this will have the effect of shifting the entire printline stored in the register 25 (FIG. 5) to the right by one thermal element position in the printhead 17. If the position control value is equal to 10, the position control value in register 40 is reset to a zero (0) value. In such a case, one completed rotation or translation of the printline will have been completed and a new one will be begun. For example, as shown in the TABLE of FIG. 4, the position of the rightmost edge of the eighth character in a printline is rotated in successive document numbers 1 through 11 from printhead element position 151 through printhead element position 141 by associated position control values of from 0 through 10. After such a rotation or translation is completed, the position control value is reset to zero (0) to start a new rotation or translation of the printline for document numbers 12 through 22.

Figure 11:
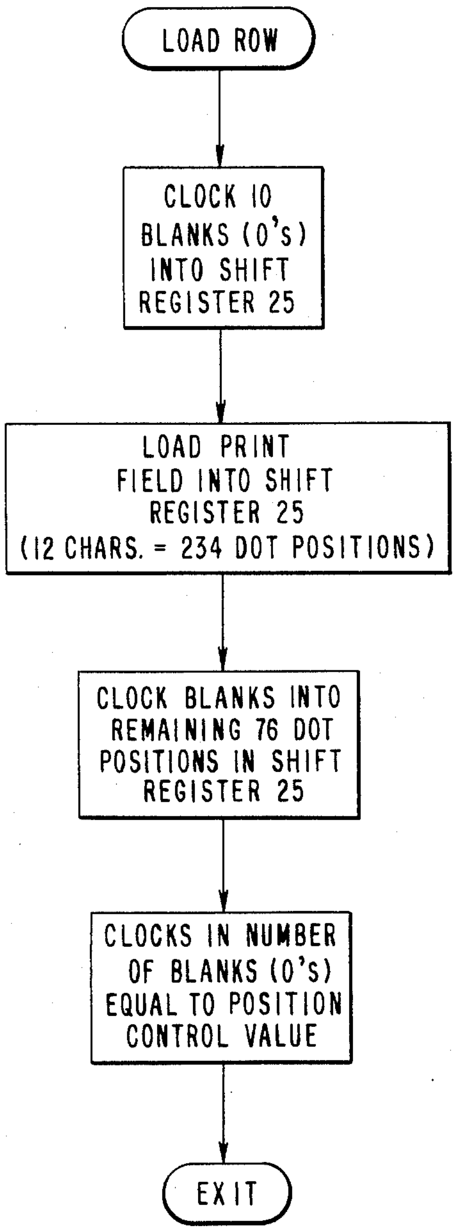

The "load row" subroutine of FIG. 11 is used to load the appropriate printline into the shift register 25 (FIG. 5). In the operation of the "load row" subroutine of FIG. 11, 10 binary 0 bits are initially clocked into the shift register 25. Then the 234 bit long print field is loaded into the shift register 25. Next 76 binary 0 bits are clocked into the shift register 25. Finally a number of binary 0 bits equal to the position control value (determined in the subroutine of FIG. 8) is clocked into the shift register 25 to obtain the desired rotational shift for the document being printed.

The circuitry for obtaining the operations described in the "load row" subroutine of FIG. 11 will now be discussed by referring to FIG. 12.

Serial data is transmitted from the microprocessor 21 (FIGS. 5 and 8) to the shift register 25 through the microprocessor special function port 73 (FIG. 8) using the SERIAL DATA and CLOCK lines 23 and 29 (FIG. 5), respectively, of the port 73. By utilizing the circuitry of FIG. 12, data and blanks can be selectively transmitted to the register 25 by means of the lines 23 and 29 in first and second modes. In the first mode one or more blanks are outputted from the circuitry of FIG. 12, whereas in the second mode data is outputted from the circuitry of FIG. 12. Essentially, FIG. 12 is a more detailed block diagram of portions of the microprocessor 21 (FIG. 8) that are used to apply data to the SERIAL DATA line 23 and CLOCKS to the CLOCK line 29.

FIRST MODE

In this FIRST MODE, a serial buffer register 55 of the microprocessor 21 is not required and is inactive or dormant. Flip flops 87 and 89 are now utilized to affect control over two of the output lines of the port 73. Specifically, these are the SERIAL DATA line 23 and the CLOCK line 29. Through use of the flip flops 87 and 89, the microprocessor 21 has the capability of transferring individual bits of data to the thermal printhead 17.

During this first mode, the outputs of the register 55 and the Q output of D type flip flop 75 are all low. This is due to the fact that any data previously contained in the register 55 and the flip flop 75 would have been automatically clocked out by the 500 $KH_z$ SHIFT CLOCK developed at the output of the divide-by-twelve countdown circuit 63. The low outputs of the register 55 and flip flop 75 are all applied as inputs to a NOR gate 77 to cause the NOR gate 77 to apply a high output through OR gates 79 and 81 to first inputs of the NAND gates 83 and 85, respectively. As a result, the outputs of the NAND gates 83 and 85 are the inverted states of the Q outputs of the flip flops 87 and 89, respectively.

Decoding logic (not shown) within the microprocessor 21 allows the instruction decoder 57 (FIG. 8) to selectively direct data to each of the flip flops 87 and 89 individually via the lines $69_1$ and $69_2$ of the internal bus 69. Hence, by executing a series of instructions making up a program routine stored in ROM 49 (FIG. 8) the microprocessor 21 is able to generate signals in the proper timing sequence on SERIAL DATA line 23 and CLOCK line 29 to shift a single bit of data into the shift register 25 of the thermal printhead 17. This capability will be used during this FIRST MODE to clock 10 binary 0 bits into the shift register 25 (FIG. 5). This is accomplished by executing instructions from the ROM 49 (FIG. 8) which cause a zero (0) to be placed on the line $69_1$ to the D-input of the flip flop 87 and then cause a "write to latch" signal to be applied to the clock input of the flip flop 87 to write that zero into the flip flop 87. That binary 0 or zero in the flip flop 87 will be inverted to a binary 1 by the NAND gate 83 to turn on a field effect transistor (FET) 91. When turned on, the FET 91 pulls the SERIAL DATA line 23 down to a zero (0) or low state.

A CLOCK pulse is now generated at the CLOCK line 29 by first executing instructions from the ROM 49 which cause a zero (0) to be placed on the line $69_2$ to the D-input of the flip flop 89 and then cause a "write to latch" signal to be applied to the clock input of the flip flop 89 to write that zero into the flip flop 89. That zero (or binary 0) in the flip flop 89 is inverted by the NAND gate 85 to turn on the FET 93 to pull the CLOCK line 29 down to a zero (0) or low state. Immediately after these instructions are executed, additional instructions from the ROM 49 are executed which cause a binary 1 to be written into the flip flop 89 to subsequently cause the CLOCK line 29 to rise to a binary 1 or high state.

This level translation loads or clocks the 0 or low state of the SERIAL DATA line 23 into the shift register 25. The above sequence is repeated 9 more times so that a total of 10 binary 0 bits are clocked into the shift register 25 (FIG. 5). Once the 10 binary 0 bits are clocked into the register 25, the output of the flip flop 87 is set high so that the register 55 may be enabled.

SECOND MODE

In this SECOND MODE, the serial buffer register 55 is used to transfer specific character bit map data stored in ROM 49 (FIG. 8) to the shift register 25 in bursts of 8 bits. It should be noted that the specific sequence of characters to be printed at this time are contained in RAM 51, having been previously transferred to the microprocessor 21 from the HOST (not shown) via data port 70 (FIG. 8).

A series of instructions making up a program routine stored in ROM 49 are executed to cause the first of two bytes of bit map data, associated with a given character, to be placed on the internal bus 69. The execution of these instructions then causes a low pulse to be applied via a WRITE SBUS line 94 to a write input ($\overline{W}$) of the register 69 to enable the data byte on bus 69 to be transferred into the serial buffer register 55. At the same time, this low pulse on the WRITE SBUF line 94 is also applied to the set (S) input of the flip flop 75 to cause the Q output of the flip flop 75 to be set high.

The non-zero contents of the register 55 cause the output of the NOR gate 77 to go low and enable OR gates 79 and 81 to pass whatever signals are at their other inputs. The serial outputs of the register 55 and ÷12 countdown circuit 63 are respectively applied to the other inputs of the OR gates 79 and 81.

The 8-bit wide, parallel-loaded data in the register 55 is serially clocked by SHIFT CLOCKS out of the register 55 and onto the SERIAL DATA line 23 via the enabled OR gate 79 and the NAND gate 83 and FET 91. SHIFT CLOCKS also pass through enabled OR gate 81, NAND gate 85 and FET 93 onto the CLOCK line 29 as CLOCK pulses. Eight shifts of the data in the register 55, as well as eight SHIFT CLOCKS, are guaranteed by the high state of the WRITE SBUF signal before that signal goes low to cause the output of the flip flop 75 to go low. At this time all 8 bits in the register 55 have been clocked out of the register 55, causing the register to again develop 0 state or low outputs. The low output of the flip flop 75 and the low outputs of the register 55 cause the NOR gate 77 to develop a high output to prevent the OR gates 79 and 81 from gating any other data through them.

After the initial 8 bits have been clocked out of the register 55, further instructions from the ROM 49 are executed to fetch the final 8 character bits. These final 8 character bits are loaded into the register 55 and the above-described operation for clocking these 8 character bits out of the register is repeated.

The operation of the system then briefly reverts to the FIRST MODE to clock out of the microprocessor 21 and into the register 25 the remaining 4 of the 6 binary 0 bits for the 6-bit gap between adjacent characters. It should be noted at this time that the first 2 binary 0 bits for the 6-bit gap between adjacent characters was included in the final two bit positions of the final 8 character bits that were loaded into the register 55. The circuit of FIG. 12 has now transmitted one complete 14 bit character and the 6 binary 0 bits for the 6-bit gap between adjacent characters.

Figure 12:
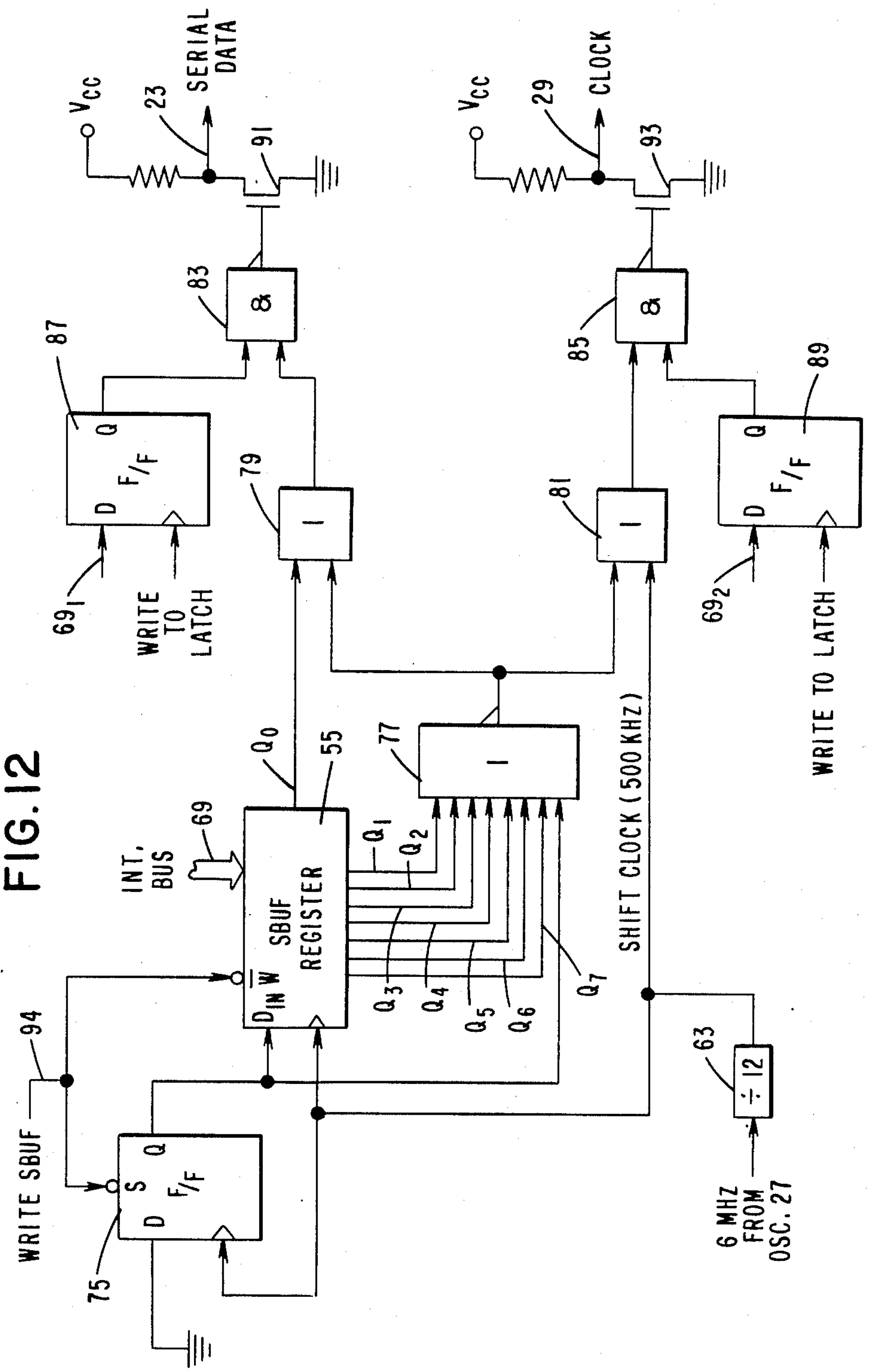
FIG. 12 is a more detailed schematic block diagram of a portion of the microprocessor of FIG. 8; for selectively formatting the data being applied to the SERIAL DATA line.

The above-described operation of the circuitry of FIG. 12 for transmitting 8 bits in the SECOND MODE, another 8 bits in the SECOND MODE and 4 bits in the FIRST MODE for each character continues for all 12 characters until a total of 234 bits have been transmitted and stored in the shift register 25.

To complete the loading of the shift register 25, 74 additional binary 0 bits are developed by the circuitry of FIG. 12, using the operation of the FIRST MODE that has previously been described. At this time a total of 320 bits of information have been transmitted from the microprocessor 21, with 10 binary 0 bits preceding the 12 characters of information and 74 binary 0 bits following those 12 characters of information.

Finally, for increasing the useful life of the thermal printhead 17, the position control value stored in the register 40 (FIG. 8) will be used in the FIRST MODE operation of the SERIAL DATA line 23 (previously discussed) to shift or translate the contents of the shift register 25 by a number of bit positions equal to the position control value. This is accomplished in the FIRST MODE of operation by further clocking into the shift register 25 a number of binary 0 bits equal to the value of the position control value. The net effect of this operation is to shift or translate the character data contained in the register 25 into one of 11 possible relative start positions, as indicated in the TABLE in FIG. 4.

The invention thus provides a system and method for increasing the operational life of a thermal printhead in a thermal printer by selectively shifting, from document to document, the entire printline of characters to be printed by associated elements in the printhead.

While the salient features of the invention have been illustrated and described, it should be readily apparent to those skilled in the art that many changes and modifications can be made in the system and method of the invention presented without departing from the spirit and true scope of the invention. For example, the system of the invention could be modified in accordance with the system described in the above-mentioned U.S. patent application Ser. No. 640,894, which is herein incorporated by reference into this application, such that when a defective thermal element in the printhead is detected, the position of that defective element relative to its associated position control value could be stored in memory and that position control value could be skipped for each repetition of the above-described position control cycle. In this manner that defective element would always be in the gap between adjacent character positions even though the print line would be successively shifted from document to document. Accordingly, the present invention should be considered as encompassing all such changes and modifications of the invention that fall within the broad scope of the invention as defined by the appended claims.

We claim:

1. A thermal printing system for printing on documents, said system comprising:

an array of thermal elements;

means for producing serial data representative of a line of multiple character segments to be printed, said serial data having a preselected number of character positions selectively associated with said thermal elements;

means responsive to said serial data for enabling said array of thermal elements to thermally print a line of character segments on an associated document in accordance with said serial data;

means for determining an associated different position control value for each successive document to be printed; and means responsive to said position control value for enabling said producing means to shift for each document the position of said serial data with respect to said thermal elements by a number of positions equal to said associated position control value.

2. The thermal printing system of claim 1 wherein said determining means comprises:

first means for storing said position control value;

second means for comparing said position control value in said first means against a predetermined value to determine whether said position control value is equal to or less than said predetermined value; and third means coupled to said second means for changing said position control value to an initial value if said position control value is equal to said predetermined value and for incrementing said position control value by a preselected number if said position control value is less than said predetermined value.

3. The thermal printing system of claim 2 wherein said enabling means comprises:

fourth means for allowing said producing means to output said serial data for a given document; and fifth means for causing said producing means to shift the position of said serial data with respect to said thermal elements by a number of positions equal to said position control value for said given document.

4. A method for increasing the useful life of a thermal printhead, said method comprising the steps of:

producing serial character segment data having a preselected number of character positions selectively associated with an array of thermal elements;

enabling the array of thermal elements to thermally print characters on an associated document in accordance with the serial character segment data;

determining an associated different position control value for each successive document to be printed; and causing the position of the serial character segment data any given document to be shifted with respect to the thermal elements by a number of positions equal to the position control value associated with the given document.

5. The method of claim 4 wherein said determining step includes the steps of:

storing the position control value;

comparing the stored position control value against a predetermined value; and changing the stored position control value to an initial position control value if the compared position control value is equal to the predetermined value and to a new position control value incremented by a preselected number if the compared position control value is less than the predetermined value.

6. The method of claim 5 wherein said causing step includes the steps of:

clocking out a first preselected number of binary zeros of data;

clocking out the serial character segment data for a given document;

clocking out a second preselected number of binary zeros of data; and clocking out a number of binary zeros equal to the position control value associated with the given document.

7. A thermal printing system comprising:

means for producing serial character segment data and enabling pulses;

thermal printing means for thermally printing characters, said thermal printing means including: a plurality of linearly aligned thermal elements; first means for selectively storing said serial character segment data, said first means having a plurality of storage locations corresponding in number to said thermal elements; and second means being responsive to said serial character segment data in said first means and to said enabling pulses for selectively applying driving pulses corresponding to said serial character segment data to said thermal elements to enable said thermal elements to print a line of character degments in accordance with said serial character segment data stored in said first means;

means for determining an associated different position control value for each successive document to be printed; and means responsive to said position control value for enabling said first means to shift for each document the position of said serial character segment data with respect to said thermal elements by a number of positions equal to said associated position control value.

8. The thermal printing system of claim 7 wherein said determining means comprises:

means for storing said position control value;

means for comparing said position control value in said storing means against a predetermined value to determine whether said position control value is equal to or less than said predetermined value; and means for changing said position control value to an initial value if said compared position control value is equal to said predetermined value and to a new value incremented by a preselected number if the compared position control value is less than the predetermined value.

9. The thermal printing system of claim 8 wherein enabling means comprises:

means for sequentially clocking into said first means a second preselected number of binary zeros of data, followed by said serial character data for a given document, followed by a third preselected number of binary zeros of data and followed by a number of binary zeros of data equal to said position control value associated with the given document.

* * * * *